United States Patent
Koppe

(10) Patent No.: US 7,576,804 B2
(45) Date of Patent: Aug. 18, 2009

(54) TRIAX TRANSMITTER AND RECEIVER INTERFACES AND TRANSMISSION SYSTEM

(75) Inventor: Rudolf Koppe, Breda (NL)

(73) Assignee: Thomson Licensing, Boulogne Billancourt (FR)

(*) Notice: Subject to any disclaimer, the term of this patent is extended or adjusted under 35 U.S.C. 154(b) by 612 days.

(21) Appl. No.: 11/168,211

(22) Filed: Jun. 27, 2005

(65) Prior Publication Data

US 2006/0001768 A1    Jan. 5, 2006

(30) Foreign Application Priority Data

Jul. 5, 2004    (FR) ................... 04 300426

(51) Int. Cl.
*H04N 5/38*    (2006.01)
(52) U.S. Cl. .................... 348/723; 348/433.1; 348/441; 348/475
(58) Field of Classification Search ............... 348/723, 348/433.1–437.1, 441, 445, 469, 475, 478, 348/461, 724–726; *H04N 5/38*
See application file for complete search history.

(56) References Cited

U.S. PATENT DOCUMENTS

| | | | |
|---|---|---|---|
| 4,535,352 A | | 8/1985 | Haskell |
| 5,053,860 A | * | 10/1991 | Tsinberg ................... 348/437.1 |
| 5,067,017 A | * | 11/1991 | Zucker ................... 375/240.01 |
| 5,598,225 A | | 1/1997 | Songer |
| 5,640,205 A | | 6/1997 | Munakata et al. |
| 5,696,560 A | * | 12/1997 | Songer ................... 348/436.1 |
| 6,124,899 A | | 9/2000 | Swan et al. |

FOREIGN PATENT DOCUMENTS

| | | |
|---|---|---|
| DE | 3311633 | 10/1984 |
| EP | 0349169 | 1/1990 |
| EP | 0809397 | 11/1997 |
| GB | 859364 | 1/1961 |

OTHER PUBLICATIONS

DE, XP02308480, Aug. 1974.
Patent Abstracts of Japan vol. 1997 No. 06, Jun. 30, 1997 and JP 09037'34 Sony Corp. Feb. 7, 1997 *the whole document*.
Search Report.

* cited by examiner

*Primary Examiner*—Trang U Tran
(74) *Attorney, Agent, or Firm*—Robert D. Shedd; Robert B. Levy

(57) ABSTRACT

A triax transmitter interface for transmitting a video signal on a triax cable comprises a video signal input port, a first modulator for modulating a luminance component of a video signal received at said input port onto a first carrier and a second modulator for modulating a chrominance component of the video signal onto a second carrier, and a triax output port for outputting said modulated carriers to a triax cable. The first modulator is a quadrature modulator adapted to modulate luminance components of two video image lines simultaneously and in quadrature onto said first carrier. A receiver interface has a quadrature demodulator for restoring the luminance component.

19 Claims, 2 Drawing Sheets

TRIAX TRANSMITTER AND RECEIVER INTERFACES AND TRANSMISSION SYSTEM

BACKGROUND OF THE INVENTION

This application claims the benefit, under 35 U.S.C. § 365 of French Patent Application 04300426.6, filed Jul. 5, 2004.

The present invention relates to interfaces for transmitting and receiving a HF modulated video signal of high bandwidth, in particular for a video camera and a base station with which the video camera communicates.

Professional high definition television (HDTV) broadcast cameras for studio and electronic field productions today use either an optical fibre or a special coaxial cable, referred to as a triax cable, for communicating with a base station where image data from one or more cameras are collected and processed. Optical fibres allow very high data rates between the camera and the base station, so that many experts expect that in the long run optical fibre technology will become standard for connecting cameras and base stations. At present, however, fibre technology has some difficulties in penetrating the market, because in many facilities where professional video cameras are used, for example in sport stadiums, triax cables are installed, whereas optical fibres are not. Accordingly, a producer who uses triax transmission technology, for recording an event, can bring his cameras to a given location, install his base station, and can interconnect cameras and base stations using triax cables that are present on the location. A producer who uses optical fibre technology cannot rely on such fibres being present, so that for recording the same event, he must not only install his cameras and base station but must also do the wiring. This does not only increase the cost of setting up his equipment, it also decreases its reliability. In addition, current technology of fibre optic connectors are more sensitive to contaminations by dust and humidity compared to triax connectors. Therefore, triax technology will probably be continued to be used for quite a long time in the future.

In a triax cable, information is transferred from the camera to the base station and vice versa using a plurality of carriers at different frequencies. Some of these have components of the camera's video signal modulated onto them in order to transfer the video signal to the base station, other carriers are modulated in the base station in order to transfer control information from there to the camera. All these carriers suffer an attenuation in the cable that imposes an upper limit for the length the triax cable can have. For standard definition cameras, this upper limit is at approx. 3 km; for HDTV cameras, in which the bandwidth of the video signal is higher, the usable maximum length of the triax cable reduces to about 1500 m.

In a number of applications, especially when recording a sports event, it is interesting to generate more pictures per second than under normal operating conditions. The extra pictures generated are used to play back certain actions in slow motion while maintaining sharpness in moving objects. This is a common feature in standard definition TV camera systems. It would be desirable to provide the same feature in HDTV cameras, too, but the problem arises that if the extra pictures also have to be transmitted via the existing triax cables, more bandwidth is needed. I.e. whereas at present a HDTV video signal occupies a frequency range between approx. 25 and 130 MHz, the spectrum of a HDTV Signal with an increased image rate will have to extend to still higher frequencies. However, since attenuation increases with frequency, this causes the maximum useable length of the cable to decrease still further. If the maximum useable length becomes less than the length of the installed cable, it is quite evident that the system will become inoperable.

BRIEF SUMMARY OF THE INVENTION

It is therefore desirable to provide triax interfaces for a video camera and a base station, which can transmit and receive, respectively, video signals of a very high image rate without suffering from the maximum useable cable length limitations set out above.

The invention proposes to provide, as a first modulator for modulating a luminance component of a video signal received at an input port of the interface e.g. from a camera head, a quadrature modulator which is adapted to modulate luminance components of two video image lines simultaneously and in quadrature onto said first carrier. The quadrature modulator practically doubles the rate at which the luminance information can be transmitted via the triax cable without increasing the frequency range occupied by said luminance information. Therefore, if an existing triax cable is found to be useable for transmitting a conventional HDTV signal, it can be expected that the same cable will be able to accommodate the luminance component of a video signal in which the frame rate is twice that of a normal HDTV signal, if the interface of the invention is used.

Of course, the use of quadrature modulation makes the luminance signal susceptible to crosstalk between in-phase and quadrature components, but even if such crosstalk cannot be totally avoided, its effect can be expected to be small if the information contained in the two image lines modulated simultaneously onto the first carrier is similar because these two lines are spatially adjacent lines in a same image.

Since in either case, said two image lines will be received at different times at the input port of the transmitter interface, the first modulator should preferably have a memory associated to it for buffering at least one of these two image lines.

In order to facilitate synchronisation of a receiver interface to the I and Q components of the modulated first carrier, the transmitter interface should preferably comprise means for transmitting phase synchronization signals for these two components.

These synchronisation signals may preferably be transmitted in a vertical blanking period of the video signal, e.g. in the form of a white line.

In order to facilitate compensation of group delay differences in the frequency band of the luminance information, a high frequency component should be contained in at least one of the synchronization signals.

Such a high frequency component having a fixed phase relationship to the first carrier may conveniently be obtained using a frequency divider for deriving the high frequency component from the first carrier itself.

The transmitter interface comprises a second modulator for modulating a chrominance component of the video signal onto a second carrier. It is known in the art that this second modulator can be a quadrature modulator. The frequency interval around the second carrier, which is allocated for transmitting the chrominance component, is therefore used very efficiently already, and it is not possible to squeeze more information into this frequency interval by changing the type of modulation. Therefore, the invention provides signal processing means connected between the video signal input port of the transmitter interface and its second modulator, which processing means are adapted to receive, in a given time unit, two lines of the chrominance component and to derive therefrom a single line to be supplied to the second modulator.

This single line may be obtained e.g. by simple decimation, i.e. by discarding one out of every two lines of the chrominance component received, or by averaging between pairs of pixels at a same horizontal location in the two lines or by applying any convenient interpolation scheme. In every case, the effect of the processing means is to reduce the resolution of the chrominance component in the vertical direction by a factor of two.

The invention further proposes a triax receiver interface as defined in claim 9, comprising, as a first demodulator, a quadrature demodulator adapted to demodulate luminance components of two video image lines simultaneously and in quadrature from the first carrier of a high frequency video signal received at the triax input port of the receiver interface. Just like the transmitter interface, the receiver interface preferably has a memory associated to its first demodulator for buffering at least one of the two simultaneously demodulated image lines, and phase synchronisation signal detecting means for detecting the phase synchronization signals of the I and Q components of the modulated first carrier. In order to compensate frequency dependent attenuation of the triax cable, the receiver interface should have an amplifier with a frequency dependent gain connected between its triax input port and said first demodulator.

As a criterium for adjusting a gain correction factor of said amplifier stage, the amount of crosstalk between a high frequency component of a synchronisation signal of one of said I and Q components and the other of said I and Q components obtained by the first demodulator may be used.

The invention further relates to a triax transmission system comprising transmitter and receiver interfaces as defined above and a triax cable connecting these interfaces. In such a system, an all-pass filter having a group delay characteristic opposite to that of the triax cable may be provided, preferably in distributed form along the triax cable or lumped at the transmitter or receiver interface.

BRIEF DESCRIPTION OF THE DRAWINGS

Further features and advantages of the invention become apparent from the subsequent description of preferred embodiments, referring to the appended drawings, in which.

DETAILED DESCRIPTION OF THE INVENTION

Figure 1:
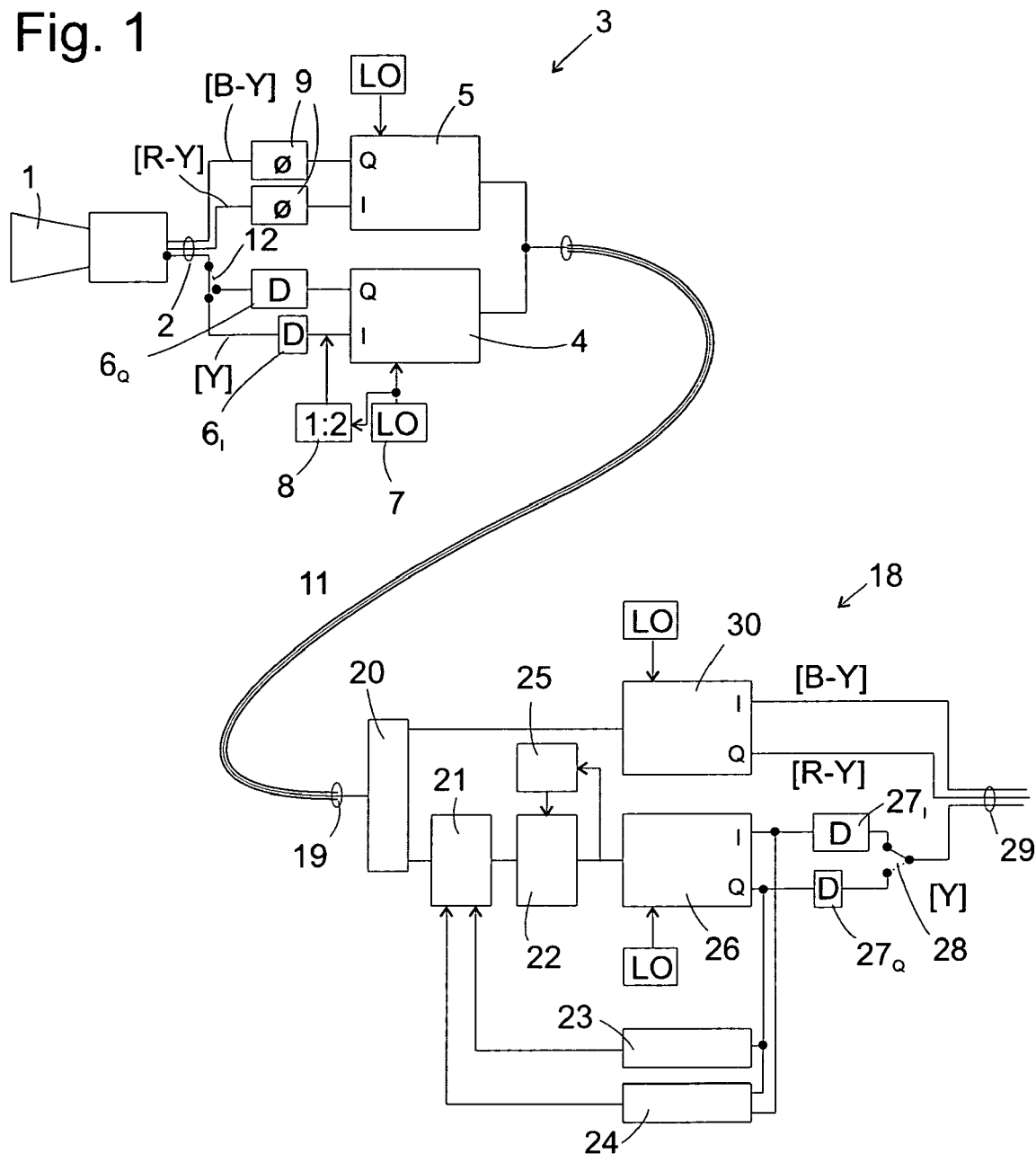
FIG. 1 is a simplified block diagram of a transmission system comprising triax interfaces according to the invention and a cable connecting them.

In FIG. 1, reference numeral 1 is a high definition video camera head which outputs a baseband video signal comprising a luminance component [Y] and two chrominance components [R-Y], [B-Y] on three lines. The camera head has a normal operating mode in which it outputs images at a rate of about 30/s, and a fast operating mode in which the image rate per second is twice that of the normal mode.

The three lines from camera head 1 are connected to a baseband input port 2 of a triax transmitter interface, generally referred by 3. In the interface 3, the luminance component [Y] reaches a switch 12 where it is distributed to one of two buffers, $6_I$, $6_Q$ according to the position of switch 12. The output ports of buffers $6_I$, $6_Q$ are connected to in-phase and quadrature input ports I, Q of a first quadrature modulator 4. A first local oscillator 7 provides a carrier signal at 56 MHz to modulator 4. The same carrier signal is supplied to a frequency divider 8.

The second modulator 5 has its in-phase and quadrature inputs I, Q connected to the [R-Y], [B-Y] lines of input port 2 via bandwidth reducing circuits 9.

When the camera head 1 is in its normal mode, the bandwidth reducing circuits 9 are idle, and the chrominance signals [R-Y], [B-Y] go through them without being modified. The switch 12 transmits the luminance component [Y] to buffer $6_I$ only, which forwards it without delay to the in-phase input I of modulator 4. Buffer 6 thus receives no data and provides a constant output of zero, so that the output of modulator 4 is determined by its in-phase input alone. By superimposing the output signals from the two modulators 4, 5 at a triax output port 10 of interface 3, a conventional HF-modulated video signal suitable for transfer on triax cable 11 is obtained.

Figure 2:
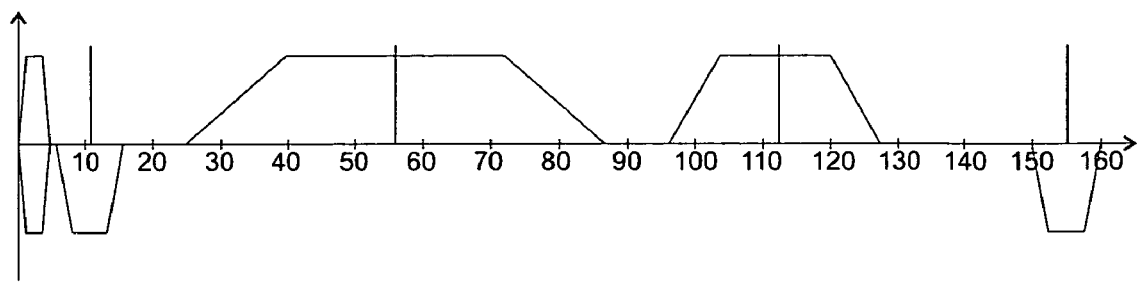
FIG. 2 is a schematic representation of the spectrum of an HDTV signal on a triax cable.

FIG. 2 illustrates the spectrum of such a HF-modulated signal, comprising luminance and chrominance bands centered around 56 and 112 MHz, respectively, and other bands for transmitting information to and from the camera, which will not be discussed here.

When the camera head 1 operates in the fast mode, the line period of the video signal received at input port 2 of the interface 3, referred to subsequently as the fast camera line period, is half the normal camera line period, i.e. two image lines are received in a time interval in which just one line is received in the normal mode.

In the fast mode, switch 12 is toggled on a line-by-line basis. I.e. an odd-numbered image line from camera head 1 has its luminance component buffered in delay buffer $6_Q$; it is not received at in-phase input I of modulator 4. When a subsequent even-numbered image line is output from camera head 1, its data are buffered in buffer $6_I$ of modulator 4, and, simultaneously, data are read from buffers $6_I$, $6_Q$ and input into the first modulator 4. The rate at which data are read from a buffer 6, or $6_Q$ is half the rate at which they are written, i.e. the modulator 4 operates with a modulator line period which is identical to the normal camera line period or twice the fast camera line period. When the even-numbered line has been received completely by the interface 3, only the first half of the two lines have been input into modulator 4. The second halves of these lines are input into the modulator 4 during the following fast camera line period, while a subsequent odd-numbered line is being written into buffer $6_Q$.

Figure 3:
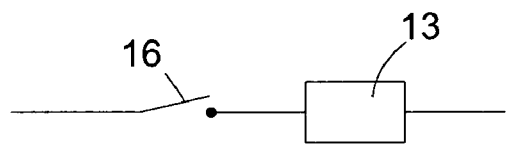
FIG. 3 illustrates a first embodiment of a bandwidth reducing circuit for the chrominance component of the HDTV signal.

According to a simple embodiment shown in FIG. 3, the bandwidth reducing circuits 9 are each formed of a switch 16 and a buffer 13, which receives chrominance data from input port 2 whenever switch 16 is closed. The switch 16 is toggled between open and closed positions at each transition from one image line to the next in the input video signal, so that the buffer 13 receives chrominance data of odd-numbered lines or of even-numbered lines only, and every other line is discarded. The rate at which data are transferred from buffer 13 to second modulator 5 is the same in normal and fast modes. The second quadrature modulator 5 may therefore be of the type which is conventionally used for transmitting an HDTV chrominance signal over a triax line and need therefore not be described in detail here.

Figure 4:
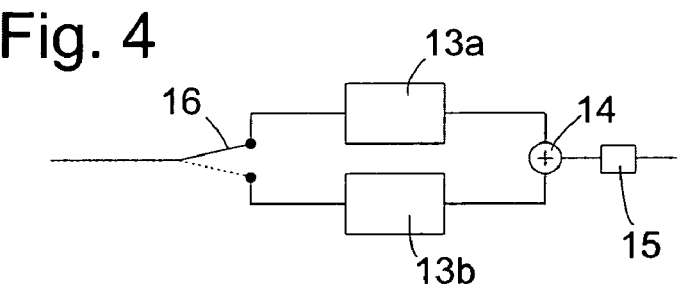
FIG. 4 illustrates a second embodiment of a bandwidth reducing circuit.

According to an advanced embodiment shown in FIG. 4, each bandwidth reducing circuit 9 has two buffers 13a, 13b, one of which is connected at a time to input port 2 by switch 16. The buffers 13a, 13b are read in synchronism, so that data corresponding to identical horizontal positions in adjacent image lines are read simultaneously from the buffers 13a, 13b and are added in an adder circuit 14 connected to the outputs of buffers 13a, 13b. Between the output of adder 14 and an input of modulator 5, there is a dividing circuit for dividing the output of the adder 14 by two, the output of which corresponds to the average of the data output from buffers 13a, 13b.

If desired, the bandwidth reducing circuits can have more than two buffers, for storing an arbitrary number of the most recent image lines, and the adder 14 and divider 15 are replaced by a more sophisticated arithmetic circuit that calculates chrominance data to be applied to the modulator 5 by any convenient pre-defined law based on data that are simultaneously read from the various buffers.

As can be seen in FIG. 2, the quadrature-modulated chrominance signal from modulator 5 has a bandwidth of approx. 30 MHz around its carrier frequency of 112 MHz, whereas the luminance component centered around 56 MHz is about 60 MHz wide. This is due to the fact that the horizontal resolution of the chrominance component is only half of that of the luminance component, i.e. the number of chrominance data supplied per image line by the camera head 1 is only half the number of luminance data.

In order to enable a receiver to distinguish between the I and Q components of the output of modulator 4, the receiver must be provided with information from which the phase of the two components at the receiver can be derived. Since the line number of the video signal provided by camera head 1 is conventionally higher than the number of lines that can actually be displayed on a screen, the non-displayed lines are available for transmitting control information of various types. In each frame of the video signal, these non-displayed lines form a consecutive block referred to as a vertical blanking period.

In each blanking period, two so-called white lines are generated, i.e. the luminance signal [Y] is held at a constant level corresponding to a maximum brightness during one fast camera line period of the vertical blanking period. It will be assumed here that the white lines are generated by camera head 1, although circuitry for generating them and inserting them in the luminance component [Y] might also be provided in interface 3 itself, instead. One of these white lines is even-numbered and is therefore applied to the I input of modulator 4 by switch 12, the other, being odd-numbered, is applied to the Q input. At the output of modulator 4, these two white lines yield two wave trains at a phase difference of 90 degrees. While the even-numbered white line is applied to the in-phase input I of modulator 4, a signal from frequency divider 8 at 26 MHz is superimposed on it. I.e., after modulation in modulator 4 the spectrum of this wave train has components at 28, 56 and 84 MHz, whereas the spectrum of the other only has one component at 56 MHz.

When the HF video signal output from transmitter interface 3 propagates along triax cable 11, it undergoes frequency dependent attenuation and phase shifts. I.e. when it reaches a triax receiver interface 18 at the other end of cable 11, amplitudes may be different for upper and lower sidebands of a same carrier, and a phase shift may exist between the two sidebands.

Before explaining how this problem is solved, the structure of the triax receiver interface will be discussed briefly referring to FIG. 1. At the triax input port 19 of the receiver interface 18, a frequency-separating filter 20 is provided for separating luminance and chrominance bands of the HF video signal. The luminance output of frequency separating filter 20 is connected to an amplifier 21, the gain g of which is essentially a linear function g=af+b of frequency f, the factors a, b of which are controlled by circuits 23, 24 so that upper and lower sidebands of the luminance component have a same, predefined power level.

The output of amplifier 21 is connected to an input of an all-pass filter 22 that applies to the luminance component a frequency dependent phase shift under control of a control circuit 25. The control circuit 25 detects from the output of all-pass filter 22 the upper and lower sidebands at 28 and 84 MHz, respectively, of the even-numbered white line on which the 28 MHz signal from frequency divider 8 is superimposed in the transmitter interface 3. At the transmitter interface 3, the phase difference between the two sidebands is defined by the phase relationship between the signals from local oscillator 7 and frequency divider 8. Since the output of frequency divider is directly derived from that of local oscillator 7, there is a known, strictly constant phase difference between the two sidebands. In the receiver interface 18, the control circuit 25 determines how much the phase difference between the two sidebands at the output side of all-pass filter 22 differs from the known phase difference the sidebands had at the transmitter interface 3, and controls the frequency dependent phase shift characteristic of all-pass filter 22 so that the expected phase difference is restored.

It should be noted that the all-pass filter 22 might just as well be placed at other locations of the transmission system, e.g. between frequency separating filter 20 and amplifier 21 or even in front of filter 20, where it might also affect the phase delay of the chrominance component. In principle, it might even be placed in the transmitter interface 3 or somewhere along the cable 11 and be remotely controlled by control circuit 25 using a control signal that is propagated in the triax cable 11 from the receiver interface 18 towards the transmitter interface 3 in a control band, e.g. the one shown in FIG. 2 to be centered on a carrier frequency between 1 and 5 MHz.

The output signal from all-pass filter 22 is demodulated in a first quadrature demodulator 26. The demodulator 26 is adapted to detect the two white lines in each vertical blanking period, to determine from these the phases of in-phase and quadrature components and to set accordingly the phases of two local oscillator signals with which the output signal from all-pass filter 22 is multiplied in demodulator 26 in order to restore the I and Q components of the luminance signal in the baseband. The power levels of the demodulated white lines are received by the circuits 23, 24 mentioned above. One circuit 23 detects a difference between the two power levels and adjusts the coefficient a of the gain function of amplifier 21 so that the difference is decreased and finally made zero. The other circuit 24 compares the power level of one of the two white lines to a desired value and increases or decreases the coefficient b so that the power level is finally set to the desired value. In this way, after a certain convergence time for adapting the all-pass filter 22 and the amplifier 21 to the attenuation characteristics of the cable 11, the I and Q components of the luminance signal are restored at the outputs of demodulator 26 identical to the input signals of modulator 4. As a result, gain of amplifier 21 is adjusted and the crosstalk between the I and Q components is reduced, in the optimum case reduced to zero.

The restored line signals appearing simultaneously at outputs I, Q of demodulator 26 are written into buffers $27_I$, $27_Q$. The operation of buffers $27_I$, $27_Q$ is opposite to that of buffers $6_I$, $6_Q$ of the transmitter interface 3. When data of an odd-numbered line have been collected in buffer $27_Q$, outputting these data at baseband output port 29 begins via switch 28 at twice the rate at which the data are written into the buffer $27_Q$, so that when the demodulator 26 has finished outputting this line, buffer $27_Q$ is empty. At that time, data of a complete even-numbered image line have been collected in buffer $27_T$, and this line is output to port 29 while a subsequent pair of lines is demodulated in demodulator 26.

The circuitry for demodulating the chrominance component in receiver interface 18 is essentially identical with that of a conventional HDTV receiver interface, so that it need not be described in detail here, and is represented in the Figure only very schematically by a second demodulator 30 that receives the chrominance component from frequency separating filter 20 and restores therefrom baseband chrominance signals [B-Y], [R-Y]. The only difference is that in the fast operating mode each line of chrominance data is output twice consecutively from the demodulator 30, so that a restored image that is output at output port 29 is formed of pairs of lines in which the chrominance data are identical. I.e. the vertical chrominance resolution of an image at port 29 in the fast operating mode is only half of the vertical chrominance resolution and the vertical luminance resolution in the normal mode. However, this loss of resolution is hardly noticeable, because in a conventional TV image, chrominance resolution in the horizontal direction is only half of the luminance resolution, so that according to the invention, chrominance resolutions in the horizontal and vertical directions are simply made equal in the fast operating mode. Luminance resolution, on the other hand, is not affected when switching from normal to fast operating mode, because the data rate in the luminance band of the signal on triax cable 11 is doubled by using quadrature modulation.

The invention claimed is:

1. A triax transmitter interface for selectively transmitting video signals having a first or a second field or frame rate on a triax cable, the first field or frame rate being lower than the second field or frame rate, comprising:
    a video signal input port,
    a first modulator for modulating a luminance component of a video signal received at said input port onto a first carrier,
    a second modulator for modulating a chrominance component of the video signal onto a second carrier, and
    a triax output port for outputting said modulated carriers to a triax cable;
    wherein said first modulator is a quadrature modulator adapted to modulate luminance components of two video image lines simultaneously and in quadrature onto said first carrier,
    wherein a first and a second memory are provided upstream of I and Q inputs of the first modulator, respectively, for buffering at least one of the two video image lines to be simultaneously modulated;
    wherein, when video signals having the first field frame or frame rate are transmitted, the luminance component of each line is applied to a first input of the modulator without being delayed in the memory, a second input of the modulator not receiving a signal, and
    wherein, when video signals having the second field or frame rate are transmitted each of the first and second memory receives at least one of the two video image lines to be modulated in quadrature, and outputs the respective video image line to the respective first and second input of the first modulator.

2. The triax transmitter interface according to claim 1, wherein the data are read from the first and second memory at half the rate at which they are written into the memory.

3. The triax transmitter interface according to claim 1, comprising means for transmitting phase synchronization signals for I and Q components of said modulated first carrier.

4. The triax transmitter interface according to claim 3, wherein said phase synchronization signal transmitting means is adapted to transmit I component and Q component synchronization signals in a vertical blanking period of the video signal.

5. The triax transmitter interface according to claim 3, wherein said synchronization signal is a white line.

6. The triax transmitter interface according to claim 3, wherein said synchronization signal has a high frequency component.

7. The triax transmitter interface according to claim 6, comprising a frequency divider for deriving the high frequency component from the first carrier.

8. The triax transmitter interface according to claim 1, wherein, when video signals having the second field or frame rate are to be transmitted, signal processing means are connected between said video signal input port and said second modulator, which processing means are adapted to receive, in a given time unit, two lines of the chrominance component and to derive therefrom a single line to be supplied to the second modulator.

9. The triax transmitter of claim 1, wherein, when video signals having the first frame rate are transmitted, the luminance component of each line is applied to the I input of the modulator without being delayed in the memory, the Q input of the modulator not receiving a signal, and wherein, when video signals having the second frame rate are transmitted, each of the first and the second memory receives at least one of the two video image lines to be modulated in quadrature, and outputs the respective video image line to the respective I and Q input of the first modulator.

10. The triax transmitter of claim 1, wherein the second field or frame rate is twice the first field or frame rate.

11. A triax receiver interface for selectively receiving video signals having a first or a second field or frame rate generated by the transmitter interface according to claim 1, comprising:
    a triax input port for connecting to a triax cable,
    a first demodulator for demodulating a luminance component of a video signal from a first carrier received at said input port, and
    a second demodulator for demodulating a chrominance component of the video signal from a second carrier received at said input port,
    wherein said first demodulator is a quadrature demodulator adapted to demodulate luminance components of two video image lines simultaneously and in quadrature from said first carrier, and
    wherein a first and a second memory are provided downstream of I and Q outputs of the first demodulator, respectively, for buffering at least one of the two video image lines to be simultaneously demodulated
    wherein, when video signals having the first field frame or frame rate are received, the luminance component of each line is output of the modulator without being delayed in the memory, a second output of the modulator not being used, and
    wherein, when video signals having the second field or frame rate are received, each of the first and second memory receives at least one of the two demodulated video image lines from the respective first and second outputs of the first demodulator.

12. The triax receiver interface according to claim 11, wherein the data are read from the memory first and second at twice the rate at which the data are written into the memory.

13. The triax receiver interface according to claim 11, comprising means for detecting phase synchronization signals for I and Q components of said modulated first carrier in a signal received at said triax input port.

14. The triax receiver interface according to claim 11, wherein an amplifier having a frequency dependent gain is connected between said triax input port and said first demodulator.

15. The triax receiver interface according to claim 14, wherein a gain correction factor of said amplifier is controlled so as to minimize crosstalk between a high frequency component of a synchronization signal of one of said I and Q components and the other of said I and Q components obtained by the first demodulator.

16. The triax receiver interface of claim 11, wherein, when video signals having the first frame rate are received, the luminance component of each line is output by the I output of the modulator without being delayed in the memory, the Q output of the modulator not providing a signal, and wherein, when video signals having the second frame rate are transmitted, each of the first and the second memory receives at least one of the two demodulated video image lines from the respective I and Q output of the first demodulator.

17. A triax transmission system for selectively transmitting and receiving video signals having a first or a second field or frame rate on a triax cable, the first field or frame rate being lower than the second field or frame rate, the system comprising a triax transmitter interface according to claim 1.

18. The transmission system of claim 17, wherein the transmitter interface and the receiver are connected by a triax cable, the system further comprising at least one all-pass filter having a group delay characteristic opposite to that of the triax cable.

19. A triax transmission system for selectively transmitting and receiving video signals having a first or a second field or frame rate on a triax cable, the first field or frame rate being lower than the second field or frame rate, the system comprising a triax receiver interface according to claim 11.

* * * * *

UNITED STATES PATENT AND TRADEMARK OFFICE
CERTIFICATE OF CORRECTION

PATENT NO. : 7,576,804 B2 Page 1 of 1
APPLICATION NO. : 11/168211
DATED : August 18, 2009
INVENTOR(S) : Rudolf Koppe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this

Seventh Day of September, 2010

David J. Kappos
*Director of the United States Patent and Trademark Office*